United States Patent [19]
Patel et al.

[11] 3,761,700
[45] Sept. 25, 1973

[54] OUTPUT CONTROL LOGIC FOR A CODE READING SYSTEM

[75] Inventors: Ramesh S. Patel, Kettering; Robert C. Gilberg, Dayton; James P. Donohue, Fairborn, all of Ohio

[73] Assignee: The National Cash Register Company, Dayton, Ohio

[22] Filed: Dec. 7, 1971

[21] Appl. No.: 205,541

[52] U.S. Cl. .......................... 235/165, 235/61.7 R
[51] Int. Cl. ............................................. G06f 7/00
[58] Field of Search .................. 235/61.7 R, 61.9 R, 235/165, 61.11 E, 61.11 D, 61.12 N, 92 EV, 92 SH, 92 CC; 340/172.5, 146.3 E, 146.3 K

[56] References Cited
UNITED STATES PATENTS 3,598,964  8/1971  Dell et al...................... 235/61.11 E
3,486,008  12/1969  Mori ............................. 340/146.3 K
3,671,718  6/1972  Genzel et al................. 235/61.12 N Primary Examiner—Thomas J. Sloyan
Attorney—J. T. Cavender et al.

[57] ABSTRACT

A system for processing a color bar code read optically from a coded medium is disclosed. The system includes logic for determining the binary code from color signals and storage means for temporarily storing the binary code. Logic is also provided which allows the reading of a double field tag and which checks the parity and the size of the captured message. Further, logic is provided for transmitting the captured message to a utilization device.

12 Claims, 30 Drawing Figures

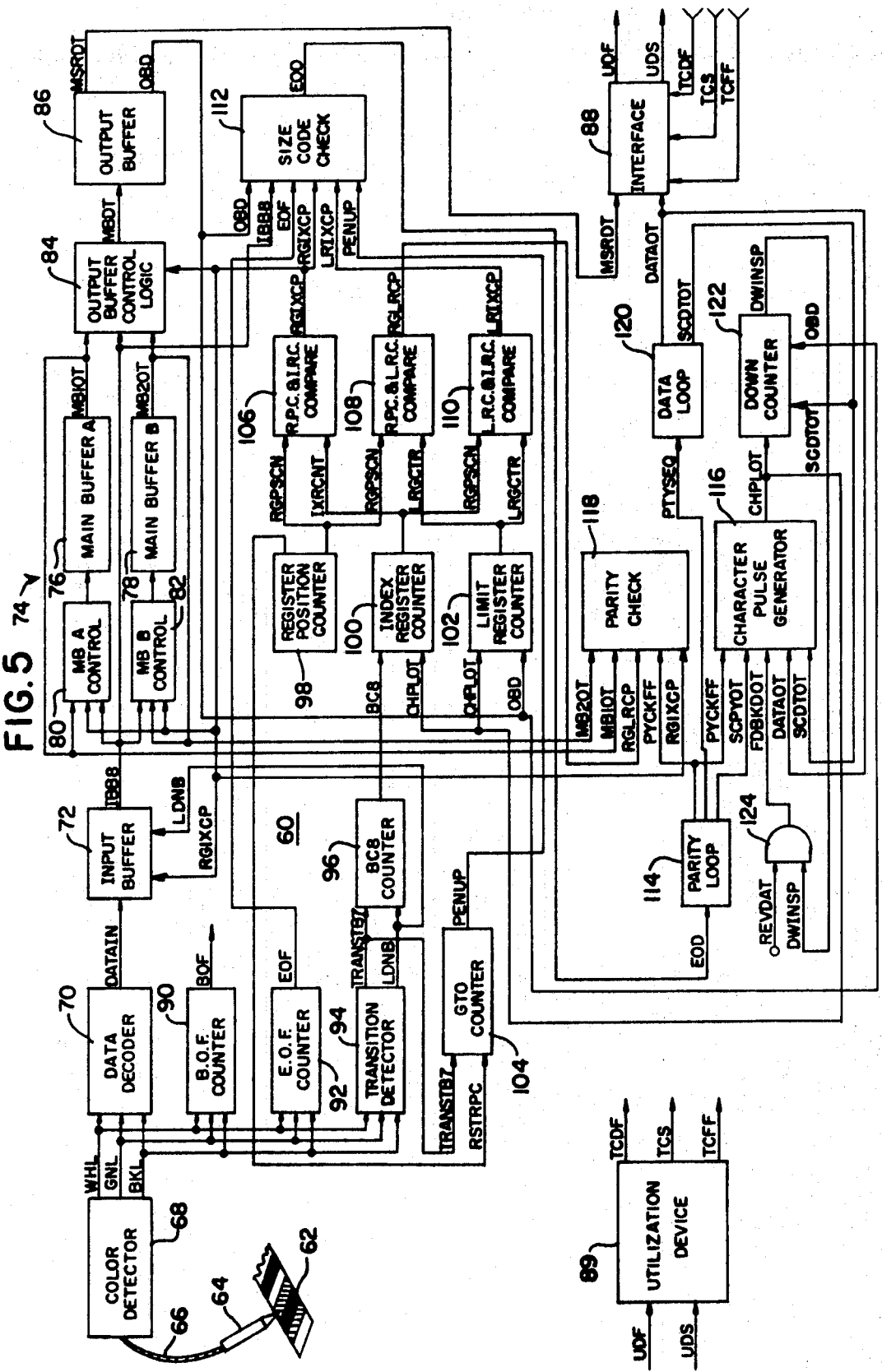

OUTPUT CONTROL LOGIC FOR A CODE READING SYSTEM

BACKGROUND OF THE INVENTION

This invention relates to code detecting apparatus and more particularly to apparatus for detecting the code manifested by a series of three or more color bars placed contiguously along a given path.

In today's world of business, it has become necessary to automatically input information into a desired business machine. To effect this desire, a compact code is attached to a medium and scanned by appropriate reading apparatus. The medium may, for instance, be a retail price tag, a credit card, a bank ledger card, or any other desired item useful for containing information. The coded information may include the price and the article inventory number in case of a retail price tag, or an account number in the case of a credit card or bank ledger card.

One type of code utilizes a series of contiguous colored bars of three or more different colors where each bar has a bar of a different color on each side thereof. The transition from one color to another color in this code represents a binary bit, and the binary bits of all transitions represent the desired information. The binary bits may be grouped by fours so that each group represents one decimal number. A more complete description of this code is given in United States Pat. application Ser. No. 837,850, filed June 10, 1969, by John B. Christie, now U.S. Pat. No. 3,671,722, and a reader for this code is described in United States patent application Ser. No. 837,514, filed June 30, 1969, by John B. Christie, Dzintars Abuls, and Wilfridus G. van Breukelen, now U.S. Pat. No. 3,637,993, both of which applications are assigned to the present assignee.

When a coded tag is being used, it is essential that the encoded information be accurately read. In this regard, the tag includes size code and parity information which is read by reading apparatus. Thereafter, logic in the reading apparatus checks the data against the size code and parity information to insure that the data is accurate.

This data may be read into a reader system and stored in two four bit character segments. Further the tag may be read in a normal forward direction or in a reverse direction and when the tag is read in a reverse direction, the captured data is the complement of the captured data read in a forward direction, as well as being in opposite order. It is necessary to provide means to transmit the captured data in proper order to a utilization device.

SUMMARY OF THE INVENTION

In accordance with one preferred embodiment of this invention, there is provided means for providing a direction signal capable of having a first or a second value, and an M character recirculating memory in which a plurality of multibit characters of data information and at least one multibit character of control information are stored, the memory having an output to which is cyclically applied the control character, followed by the data characters, the data characters being applied to the output least significant character first when the direction signal is the first value and most significant character first when the direction signal is the second value. There is also provided index register means capable of being forced to an initial count of the number of characters applied to the memory output from the time the control character is applied thereto until after the time the most significant character is applied thereto, the index register on command of a command signal being incremented in the event the direction signal is the first value and being decremented in the event the direction signal is the second value and position counter means for cyclically counting from one to M by incrementing the count thereof once each character time, the count of the position counter means being one during the time the control character is being applied to the output. A comparator means is further provided for providing a compare signal whenever the counts of the index register means and the position counter means are equal, and means for providing the command signal after each time the compare signal occurs.

BRIEF DESCRIPTION OF THE DRAWINGS

The subject matter of the invention is pointed out and distinctly claimed in the concluding portion of the specification. The invention, however, both as to its organization and method of operation may best be understood by reference to the following description taken in conjunction with the accompanying drawings, in which:

FIG. 5 shows a general block diagram of the reading apparatus for reading the color bar tags shown in FIGS. 1A and 1B;

It will be noted that the figures are numbered to correspond to the numbering of the figures of the Gilberg et al. U.S. Patent No. 3,717,750, referenced below.

DESCRIPTION OF THE PREFERRED EMBODIMENT

Figure 1A:
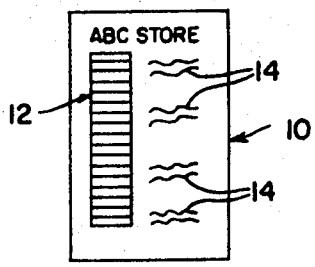
FIG. 1A shows a single field color bar tag.

Referring now to FIG. 1A, there is shown a typical single field tag 10 which can be used in a retail store. Tag 10 includes data field 12 consisting of a plurality of colored bars placed contiguous to one another. The bars may be of three different colors, such as green, black, and white, and the background color of tag 10 may be white. In practice, the data field is printed by printing the green and black bars and leaving a space for the white bars. A printer for printing the tag 10 is described in U.S. Pat. application Ser. No. 51,073, filed June 30, 1970, by Donald E. Landis and entitled "Color Bar Printer." Tag 10 also includes several series of human readable printing 14, which manifests the essential information contained in the data field 12. This is provided so that the customer knows the price and also so that the information can be entered manually in the event of an equipment breakdown.

Figure 1B:
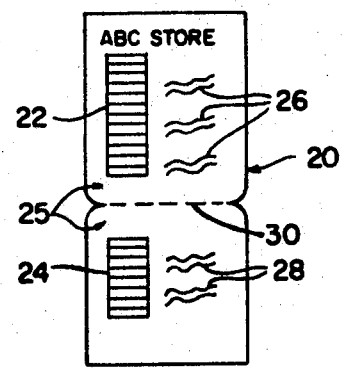
FIG. 1B shows a double field color bar tag.

FIG. 1B shows a typical double field tag 20, which includes two color bar coded data fields 22 and 24 separated by an area 25. Data field 22 may include inventory control information such as department number, class number, stock keeping unit (s. k. u.) number, size, color, and so forth. This information is printed as human readable printing 26 to the side of data field 22. Data field 24 may include the price information, which is manifested by human readable printing 28. Data field 24 and printing 28 can be detached from tag 20 along perforations 30 in the event of a price change, and a new data field and associated printing manifesting the new price can be affixed to complete tag 20 with the proper price information, or the price may be inserted manually, if desired.

Data fields 12, 22, and 24 may be scanned with a pen-like device which is described in detail in the above-noted Christie et al. United States patent application and which provides a signal indicative of the color of the bar then being scanned. These color signals are processed by logic circuitry to obtain the desired information, which is then transmitted to a utilization device, such as the retail sales terminal described in United States patent application Ser. No. 71,971, filed Sept. 14, 1970, by James E. Zachar and Walter E. Srode, Jr. now U.S. Pat. No. 3,686,637, and entitled "Retail Terminal", which is assigned to the present assignee.

Figure 2A:
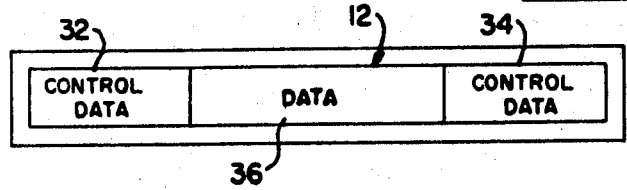
FIG. 2A shows the general layout of a single field tag.

Referring now to FIG. 2A, there is shown the general coded layout of data field 12 of single field tag 10. Data field 12 includes front and back control data portions 32 and 34 and data portion 36. Front control data portion 32 includes a single direction bit, a four bit size code, and a two bit tag identification code. Back control data portion 34 includes a single direction bit, a four bit size code, a two bit MOD3 parity code, and a four bit block check code (B. C. C.) parity code. Data portion 36 may contain from 2 through 28 (even numbers only) four bit binary coded decimal (B. C. D.) characters.

Figure 2B:
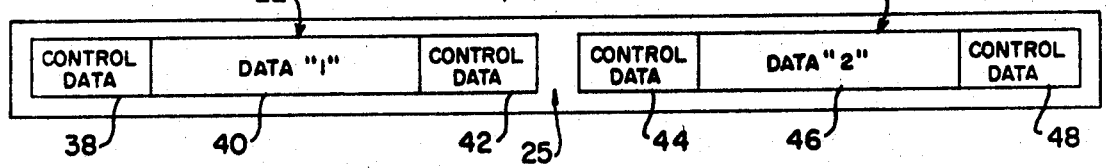
FIG. 2B shows the general layout of a double field tag.

FIG. 2B shows the general coded layout of the data fields 22 and 24 of double field tag 20. Data field 22 contains front control data portion 38, data "1" portion 40, and back control data portion 42, and data field 24 contains front control data portion 44, data "2" portion 46, and back control data portion 48. Area 25 is between back control data portion 42 and front control data portion 44. Front control data portions 38 and 44 contain a single direction bit, a four-bit size code, and a two-bit identification code. Back control data portions 42 and 48 contain a single direction bit, a four-bit size code, a two-bit MOD3 parity code, and a four-bit B. C. C. parity code. Data "1" portion 42 and data "2" portion 46 contain from 2 to 28 (even numbers only) four-bit B. C. D. characters.

Figure 3:
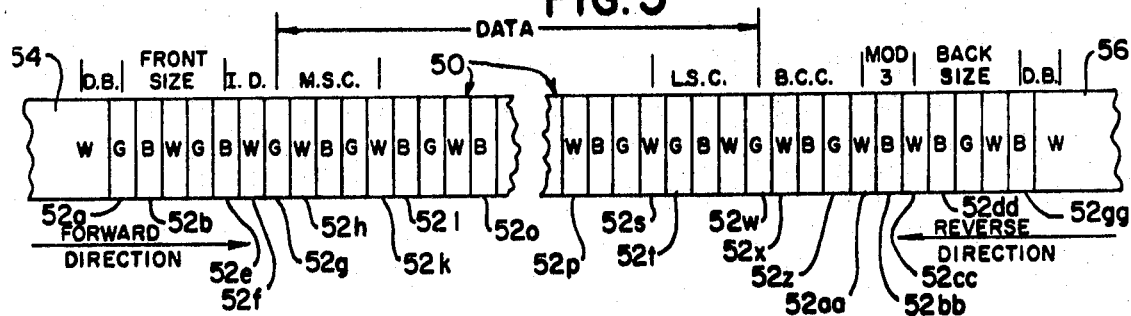
FIG. 3 shows a specific layout of the color bars in a field of a color bar tag.

FIG. 3 shows an example of a data field 50, which includes a plurality of individual color bars 52a–52gg each contiguous with one another. Field 50 may be either field 12 or one of fields 22 or 24. Each of the bars 52 is labeled either "W", "G", or "B" to indicate whether they are a respective white, green, or black bar. On the left and right of data field 50 are larger white areas 54 and 56, which are part of the background of the tag. If field 50 is one of the fields of a double field tag, one of the areas 54 or 56 will be area 25 shown in FIGS. 1B or 2B. The colors of the bars 52a–52gg are so arranged that no bars of the same color are adjacent to each other.

In coded tags, such as those shown in FIGS. 1 through 3, it is desirable that the coding be capable of being scanned in either direction; that is, from top to bottom, or from bottom to top, in the case of FIG. 1, and from right to left or from left to right in the case of FIGS. 2 and 3. To accomplish this in the code of FIG. 3, the leftmost bar 52a is green, and the rightmost bar 52gg is black. A forward direction scan is defined when data field 50 is scanned from green bar 52a to black bar 52gg (left to right in FIG. 3), and a reverse direction scan is defined when data field 50 is scanned from black bar 52gg to green bar 52a (right to left in FIG. 3). Logic within the reader (to be hereinafter explained in detail) will look at the first binary bit detected and provide a signal indicative of the direction scanned.

Figure 4A:
FIGS. 4A and 4B show code detecting charts.
Figure 4B:

Before a discussion of the coding layout of FIG. 3 in detail, it is necessary to understand the code itself. For this, reference is made to FIGS. 4A and 4B, where two code decipher charts are shown. The color bar code is a transition code; that is, the transition from one color to another color represents a binary digit (bit) of either "1" or "0". Specifically, as shown by FIG. 4A, transitions from white to green, green to black, and black to white represent "0" bits, and, as shown by FIG. 4B, transitions from white to black, black to green, and green to white represent "1" bits.

Referring again to FIG. 3, it is seen that the first transition in a forward direction scan is from white background area 54 to green bar 52a, and this represents a "0" bit. On the other hand, the first transition 17 a reverse direction scan is from white background area 56 to black bar 52gg, and this represents a "1" bit. Since the first bar 52a will always be green and the last bar 52gg will always be black, the first bit detected represents the direction of the scan. It should be noted that the bit values determined in a reverse scan will be in opposite order and the complement of the bit values obtained while scanning in the forward direction. For instance, the last bit detected in a forward direction scan will be a "0" bit due to the black bar 52gg to white background area 56 transition, whereas this transition occurs first and represents a "1" bit for a reverse direction scan.

For brevity hereinafter with respect to FIG. 3, the coding format of data field 50 will be described as being scanned in the forward direction, it being understood that for a reverse direction scan oppositely ordered complementary bits are provided. Bars 52b–52e form the front size code and are selected so that the transitions to those bars will give the complement of one more than the number of eight-bit characters in the data portion, with the most significant bit of the front size code being scanned first. It should be noted that each eight-bit character includes two four-bit B. C. D. digits. Thus, the number of four-bit B. C. D. characters will be (2N−2), where N is the size code number which is defined by the complement of the front size code.

The bars 52f and 52g form an identification code (I. D.) to indicate whether a single field tag, such as the tag 10, or a double field tag, such as the tag 20, is being scanned. If the transitions to these bars produce the binary code "0–0", a single field tag is being scanned; if the transitions to these bars produce the binary code "0–1" (most significant digit first), the first data field of a double field tag is being scanned; and if the transitions to these bars produce the binary code "1–1", the second data field of a double field tag is being scanned. For a reverse direction scan, these binary codes will be reversed and complemented.

Next, the data contained in the data field is scanned by determining the transitions to bars 52h through 52w. As previously mentioned, each four successive bars constitute a B. C. D. character, and there are (2N−2)

B. C. D. characters of data, where N is the number in the size code, arranged most significant character first, with each B. C. D. character being arranged least significant bit first.

After the data of the data field 50 is detected, bars 52x–52aa are scanned, and the transitions to these bars provide the four-bit B. C. C. parity code. The B. C. C. parity code is determined by adding the "1" bits in each significant position of each B. C. D. character, and dividing this sum by two, the remainder being the B. C. C. code. For example, for the four B. C. D. characters "0-1-0-0", "0-0-1-1", "1-0-0-1", and "0-1-1-0" (least significant digit first), the B. C. C. code is calculated as follows:

```
                        0-1-0-0
                        0-0-1-1
                        1-0-0-1
                        0-1-1-0
adding the "1" bits   : 1 2 2 2
dividing each sum by 2 :  ÷ 2
quotient                0 1 1 1
remainder (B. C. C.)  : 1 0 0 0
```

Thus, the B. C. C. Parity code is "1-0-0-0".

After the B. C. C. parity code has been detected, a two-bit MOD3 parity code is detected by finding the transition to bars 52bb and 52cc. These two bits will insure that the last bar 52gg will be black in addition to affording a second parity check. The MOD3 parity code is determined by counting the total number of "1" bits and "0" bits in the entire data field, excluding the MOD3 parity code, dividing each of these sums by 3, and adding a sufficient number of "1" bits as the MOD3 parity code to make the remainders equal. For example, if in a data field there are 20 "1" bits and 12 "0" bits, the MOD3 code is calculated as follows:

divide "0" total by 3 : 20/3 = 6, remainder 2
divide "1" total by 3 : 12/3 = 4, remainder 0
remainder difference : 2

Thus, two "1" bits are needed to make the remainders equal, so the MOD3 parity code will be "1-1".

Following the MOD3 parity code is the back size code, which is determined by the transition to bars 52dd through 52gg. In the case of the back size code, the true values of the bits are scanned, least significant bit first. Thus, the back size code is in opposite order and complementary to the front size code. This results in the second through fifth bits of the code being the same regardless of whether the data field is scanned in a forward or a reverse direction. The final bit in the data field 50 will be the direction bit defined by the transition from bar 52gg to background area 56, and this will be the same as the original direction bit defined by the transition from background area 54 to bar 52a.

Referring now to FIG. 5, a generalized block diagram of the Color Bar Reader 60 is shown. A color bar field 62 is scanned by an optical pen-shaped probe 64. Light rays indicative of the color then being scanned are transmitted through a fiber optic bundle 66 to Color Detector Circuit 68. Color Detector Circuit 68 provides three pulse shaped signals which indicate the color then being scanned. If a white color bar is scanned, the WHL signal is a logic "0" signal, and the GNL and BKL signals are logic "1" signals. Similarly, if a respective green or black color bar is being scanned, the respective GNL or BKL signals are logic "0", and the other two signals are logic "1" signals. A detailed description of the probe 64, the fiber optic bundle 66, and the Color Detector Circuit 68 is given in the above-mentioned Christie et al. United States patent application.

The three color signals WHL, GNL, and BKL are applied to Data Decoder Means 70, which provides a DATAIN signal, which is the binary coded signal of the code in data field 62. The DATAIN signal is applied to Input Buffer Means 72, and, after eight bits have been applied thereto, the RGIXCP signal becomes logic "1" and causes the eight bits in Input Buffer Means 72 to be transferred as the IBB8 signal to character position one of the Main Buffer Means 74.

Main Buffer Means 74 includes a 136-bit Main Buffer A 76 and a second 136-bit Main Buffer B 78, each of which has respective control circuits MBA Control Means 80 and MBB Control Means 82 associated therewith. For a single field tag, or the first scanned field of a double field tag, the information detected is stored in Main Buffer A 76, and, for the second scanned field of a double field tag, the information detected is stored in Main Buffer B 78. The term first scanned field is defined to be data field 22 in FIG. 2B for a forward direction scan and data field 24 for a reverse direction scan. The term "second scanned field" is defined to mean field 24 for a forward direction scan and field 22 for a reverse direction scan.

Upon command of the RGIXGP signal, an eight-bit character is shifted from Main Buffer Means 74 through Output Buffer Control Logic 84 and Output Buffer Means 86 to Interface Means 88. Interface Means 88 interfaces the Reader 60 with an appropriate Utilization Device 89, such as the Terminal Control Unit shown in the above-cited Zachar et al. United States patent application and further described in United States patent application Ser. No. 72,084, filed Sept. 14, 1970, by Ralph D. Haney et al. now U.S. Pat. No. 3,702,988, and entitled "Digital Processor," which is assigned to the present assignee. Before Interface Means 88 transmits any data to Utilization Device 89, the data must be checked to insure its accuracy. For this, the remainder of Reader 60 is provided.

The WHL, GNL, and BKL signals from Color Detector Circuit 68 are also applied to a Beginning Of Field (BOF) Counter Means 90, and End Of Field (EOF) Counter Means 92 and Transition Detector Means 94. BOF Counter Means 90 counts the time the WHL signal is logic "0" and compares this time to the time the next GNL or BKL signal is logic "0". If it turns out that the GNL or BKL signal time is less than one fourth the WHL signal time, the BOF signal becomes a logic "1". This indicates that a transition from the white background color to the first bar has occurred. Similarly, EOF Counter Means 92 counts the time a BKL or a GNL signal is logic "0" and compares this time to the time the immediately subsequent WHL signal (if any) is logic "0". If the WHL signal is logic "0" four times as long as the previous GNL or BKL signal, the EOF signal becomes logic "1". This indicates that the last transition of the data field has occurred.

Every time a color transition occurs and a DATAIN bit is provided, Transition Detector Means 94 provides an LDNB signal and a TRANSTB7 signal, and these signals are applied to BC8 Counter Means 96. The LDNB signal is also applied to Input Buffer Means 72 to enable the DATAIN bit to be applied thereto. BC8 Counter Means 96 increments its count from one to eight each time the LDNB signal occurs and the count therein at any time equals the number of bits stored in Input Buffer Means 72.

In addition to BC8 Counter Means 96, four other counters are included in Reader 60. These are Register Position Counter Means 98, Index Register Counter Means 100, Limit Register Counter Means 102, and Gross Time Out (GTO) Counter Means 104. Register Position Counter Means 98 is a free-running counter which continually counts from one to 17. It is used to keep track of the information in Main Buffer Means 74. Index Register Counter Means 100 works in conjunction with Register Position Counter Means 98 to load and unload data into and out of Main Buffer Means 74. It is incremented by each BC8 pulse provided from BC8 Counter Means 96. Limit Register Counter Means 102 is used in conjunction with Index Register Counter Means 100 to compare the length of the data, to add four dummy bits into Input Buffer Means 72, and to detect the end of data. It is used in conjunction with Register Position Counter Means 98 to detect the end of message and initiate the parity check. The size code from Output Buffer Means 86 is applied to Limit Register Counter Means 102 and stored therein for future reference. GTO Counter Means 104 is a switchable counter which provides a PENUP signal either if probe 62 scans the same color for either one fourth of a second or one second, depending upon whether a color bar, or area 25, shown in FIGS. 1B and 2B, is being scanned. It is incremented by the RSTRPC signal provided from Register Position Counter Means 98 and reset by each TRANSTB7 pulse from Transition Detector Means 94. The PENUP signal is provided one fourth of a second after the last transition in case a bar is being scanned and after one second in case area 25 of a double field tag is being scanned. The switchability of GTO Counter Means 104 is controlled by the size code and the ID code in the first scanned data field.

Register Position Counter and Index Register Counter (R. P. C. and I. R. C.) Compare Means 106 provides an eight-bit-long RGIXCP signal every time the count in Register Position Counter Means 98 equals the count in Index Register Counter Means 100. This signal allows the data transfer between Input Buffer Means 72 and Main Buffer Means 74 and between Main Buffer Means 74 and Output Buffer Means 86. Register Position Counter and Limit Register Counter (RCP & LRC) Compare Means 108 provides an RGLRCP pulse signal whenever the count in Register Position Counter Means 98 equals the count in Limit Register Counter Means 102. Limit Register Counter and Index Register Counter (LRC & IRC) Compare Means 110 provides an LRIXCP signal whenever the count in Limit Register Counter Means 102 equals the count in Index Register Position Counter Means 98.

After the entire data field has been scanned, it is necessary to provide an End of Data (EOD) signal. This signal is provided after two size code checks have been performed by Size Code Check Means 112. The first size code check is comparing the first size code detected with the second size code detected and is accomplished as follows. After the first eight bits are detected and stored in Input Buffer Means 72, they are transferred to both Main Buffer Means 74 and Output Buffer Means 86, causing the first detected size code to be stored in Output Buffer Means 86. After the last data bit is detected from the tag and the EOF signal becomes logic "1", the second detected size code is in Input Buffer Means 72. At this time, the size codes in both Input Buffer Means 72 and Output Buffer Means 86 are applied to Size Code Check Means 112 as the OBD and IBB8 signals are compared with one another. The second size code check is performed by also applying the OBD signal to Limit Register Counter Means 102, so that the size code is also stored therein. It should be noted that at this time (after the EOF signal) the count in Index Register Counter Means 100 will be one less than the total number of eight-bit characters detected, since the last detected character is still in Input Buffer Means 72 and the count in Limit Register Counter 102 reflects the size code number, which is two less than the total number of eight-bit characters scanned. If the front and back size codes properly compare in Size Code Check Means 112, the count in Limit Register Counter Means 102 is increased by two, and the count in Index Register Counter Means 100 is increased by one. If all bits of the code have been detected, this should make the count in Index Register Counter Means 100 equal the count in Limit Register Counter Means 102, thereby causing the LRIXCP signal to become a logic "1". When the RGIXCP signal becomes logic "1", the EOD signal will become logic "1", indicating that the two size code checks have been successfully completed.

If one or both of the two size code checks are unsuccessful, it is still desirable for the EOD signal to become logic "1". This will occur after the GTO counter 104 provides the logic "1" PENUP signal, due to probe 64 remaining on white background area 56 in FIG. 3.

After the size code has been checked, the B. C. C. and MOD3 parity of the captured data is checked. The EOD signal is applied to Parity Loop control logic 114 and causes the SCPYOT signal and the PTYSEQ signal to be set to logic "1". The SCPYOT signal is applied to Character Pulse Generator Means 116 and sets the CHPLOT signal for one character time (eight bit times). This causes Index Register Counter Means 100 to be set to a count of one, and, when Register Position Counter Means 98 has a count of one, the RGIXCP signal becomes logic "1" for one character time. This clears Index Register Counter Means 100 and causes the first eight control bits stored in the first position of Main Buffer Means 74 to be shifted into Output Buffer Means 86. The size code in these eight bits is then shifted to Limit Register Counter Means 102, and two is added to the count in Limit Register Counter Means 100, so that the count therein corresponds to the number of characters in Main Buffer Means 74.

At this time, the PYCKFF signal is set to logic "1", and it resets the SCPYOT signal and causes the CHPLOT signal from Character Pulse Generator Means 116 to be set for one character time. This, in turn, causes a count of one to be placed in Index Register Counter Means 100, and the RGIXCP signal becomes logic "1" when the count in Register Position Counter Means 98 becomes one. Now the RGIXCP signal is held at logic "1" until the count in Register Position Counter Means 98 matches the count in Limit Register Counter Means 108; that is, until the RGLRCP signal becomes logic "1". During this time, all of the bits in Main Buffer Means 74 are shifted through Parity Check Logic Means 118, and the B. C. C. and MOD3 parity of the data stored in Main Buffer Means 74 is checked. If the parity check is successful, then the PYCKFF and PTYSEQ signals are reset to logic "0".

At this time, the data has been completely checked and is ready to be transmitted to Utilzation Device 89. After the PTYSEQ signal is reset, the SCDTOT signal from Data Loop Logic Means 120 is set. This signal acts the CHPLOT signal to logic "1" for one character time and causes a count of one to be placed in Index Register Counter Means 100. When the next RGIXCP signal occurs, the first character in Main Buffer Means 74 is shifted into Output Buffer Means 86, and the size code portion thereof is placed in Limit Register Counter Means 102. Then the DATAOT signal becoms logic "1", and the data transfer commences.

If the tag had been scanned in the forward direction, the CHPLOT signal is set for two character times, causing a count of two to be placed in Index Register Counter Means 100. When the RGIXCP signal becomes logic "1", the first eight-bit character of true data is shifted from position two in Main Buffer Means 74 to Output Buffer Means 86. Upon command of Utilization Device 89, the data in Output Buffer means 86 is then right shifted and transmitted through Interface Means 88 to Utilization Device 89. During this time, Index Register Counter Means 100 is incremented by one, and, upon the next logic "1" RGIXCP signal, the next eight bits of data are transferred to Output Buffer Means 86. This sequence continues until the count in Index Register Counter Means 100 equals the count in Limit Register Counter Means 102. Then, when the last data character is sent to Output Buffer Means 86, the LRIXCP signal becomes logic "1" and indicates that no more data is to be sent.

If the tag had been scanned in the reverse direction, the data stored in Main Buffer Means 74 would have been stored in opposite order and complementary to the data which is to be sent to Utilization Device 89. In this case, the SCDTOT signal causes the size code to additionally be loaded into Down Counter 122. Whenever the count in Down Counter 122 is fifteen or less, a one-character-long DWINSP signal is produced, and this signal is applied through CHPLOT control gate 124 to provide a logic "1" FDBKDOT signal, since the REVDAT signal is true for a reverse scan. The FDBKDOT logic "1" signal sets the CHPLOT signal, which remains logic "1" for N+1 character times, where N is the size code. For each character time the CHPLOT signal is logic "1", a count of one is subtracted from the count in Down Counter 122, and a count of one is added to the count in Index Register Counter Means 100. Further, for every character time after four that the CHPLOT signal is logic "1", a count of one is subtracted from the count in Limit Register Counter Means 102. Thus, when the CHPLOT signal returns to logic "0" after N+1 character times, Limit Register Counter Means 102 has a count of three, Index Register Counter Means 100 has a count of N+1, and Down Counter 122 has a count of zero. The count of three in Limit Register Counter Means 102 is the position in Main Buffer Means 74 of the least significant character of data, and the N+1 count in Index Register Counter Means 100 is the position in Main Buffer Means 74 of the most significant character of data. Special logic is also provided for situations when the size code is three or two, and this is described in detail hereinafter. When the RGIXCP signal becomes logic "1", the most significant character of data is transferred from Main Buffer Means 74 to Output Buffer Means 86. This is the same data that would be first transferred if a forward scan occurred, except that it is in opposite order and complementary thereto. This data is complemented and left shifted out of Output Buffer Means 86 and transmitted through Interface Means 88 to Utilization Device 89, and a count of One is subtracted from the count in Index Register Counter Means 100.

The above procedure repeats itself until the count in Index Register Counter Means 100 matches the count in Limit Register Counter Means 102, at which time the LRIYCP signal becomes logic "1", indicating that the last character is being transferred from Main Buffer Means 74 to Output Buffer Means 86 and the entire message has been read from Main Buffer Means 74.

For a complete understanding of the reading apparatus of FIG. 5 and of the present invention which is embodied in such reading system, U.S. Patent Application, Serial No. 205,543, filed December 7, 1971, now U.S. Patent No. 3,717,750, issued February 20, 1973, entitled "Input Control Logic For a Code Reading System" by Robert C. Gilberg, James P. Donohue, and Ramesh S. Patel and assigned to the assignee of the present invention is hereby incorporated by reference herein and made a part of the instant application. More particularly, FIGS. 14A through 14L of the drawings and column 13, line 2 through column 87, line 26, are referred to as being pertinent to the invention claimed herein.

What is claimed is:

1. In a data processing system capable of developing characters of data information in a most significant or least significant order and providing said characters of data information in said most significant order regardless of the order in which said characters of data information are developed, output logic comprising:

means for providing a direction signal capable of having a first or a second value, said values respectively being indicative of whether the characters of data information are developed in said most significant order or said least significant order;

an M equal to or greater than one character recirculating memory in which a plurality of multibit characters of said data information and at least one multibit character of control information are stored, said memory having an output to which is cyclically applied said control character, followed by said data characters, said data characters being applied to said output most significant character first when said direction signal is said first value and least significant character first when said direction signal is said second value;

index register means capable of being forced to an initial count of the number of characters applied to said memory output from the time said control character is applied thereto until after the time said most significant character is applied thereto, said index register on command of a command signal being incremented in the event said direction signal is said first value and being decremented in the event said direction signal is said second value;

count forcing means responsive to the application thereto of said control character and said direction signal for forcing the count of said index register means to the initial count thereof;

position counter means for cyclically counting from one to M by incrementing the count thereof once each time a character is applied to said output, the count of said position counter means being one during the time said control character is being applied to said output;

comparator means for providing a compare signal whenever the counts of said index register means and said position counter means are equal, the first occurring one of said compare signals occurring when the most significant data characer is available at said output of said memory and successively occurring ones of said compare signals occur when each of said data characters stored in said memory are available at said output of said memory in decreasing significance order; and means for providing said command signal after each time said compare signal occurs.

2. The invention to claim 1:

wherein said combination further includes limit register means capable of being forced to an initial count equal to the number of characters applied to said output from the time said control character is applied thereto until after the time said least significant character is applied thereto, and second comparator means for providing a second compare signal whenever the counts of said limit register means and said index register means are equal, said second compare signal occurring after the time said least significant data character stored in said memory is available at said output of said memory;

wherein said command signal providing means provides said command signal until said second compare signal occurs; and wherein said count forcing means is also responsive to the application thereto of said control character and said direction signal for forcing the count of said limit register means to the initial count thereof.

3. The invention according to claim 2 wherein said memory is a shift register and said control character and said data characters are applied serially to said output.

4. The invention according to claim 2:

wherein said control character includes at least one bit manifesting a size code number which is related to the number of information characters stored in said memory; and wherein said count forcing means is responsive to the application thereto of said size code bits and said direction signal for forcing the counts of said index register means and said limit register means to the initial counts thereof.

5. The invention according to claim 4:

wherein said memory is a shift register, and said control character and data characters are applied serially to said output, an output signal thereby being provided which manifests the bits stored in said memory, said count forcing means being responsive to the size code bits manifested by said output signal.

6. The invention according to claim 5:

wherein said count forcing means responds to said direction signal having said first value by forcing the count of said index register to a fixed number equal to the number of control characters applied to said output prior to the application thereto of said most significant data character and by forcing the count of said limit register means to a count related to said size code number; and wherein said count forcing means responds to said direction signal having said second value by forcing the count of said index register to a count related to said size code number and by forcing the count of said limit register to a fixed number equal to the number of control characters applied to said output prior to the application thereto of said least significant data character.

7. The invention according to claim 6:

wherein said combination further includes output register means for storing a selected character of said output signal which is applied thereto, said selected character being the one immediately following the occurrence of said first compare signal, said character being provided in a first bit order of significance in the event said direction signal is said first value and in the opposite bit order of significance in the event said direction signal is said second value, said output register means including logic means for causing said selected character to be provided as an output register signal in a given bit order of significance regardless of said direction signal value.

8. The invention according to claim 7:

wherein said output register is a right-left shift register which provides said output register signal by right-shifting the selected character stored thereby in the event said direction signal is one value and by left-shifting the selected character stored thereby in the event said direction signal is the other value.

9. Control logic for causing the data stored in an M equal to or greater than one character recirculating memory to be transferred as a memory output signal through an output thereof to a utilization device, said memory storing a plurality of multibit data characters, at least one front control multibit character and at least one back control multibit character, each of said one front and one back control characters including a multibit size code manifesting a number related to the number data characters, said plurality of multibit data characters including a most significant character and a least significant character with a given number, including zero, of characters decreasing in significance order therebetween, the arrangement of said characters in said memory being in accordance with the value of a direction signal such that for a first direction signal value, the characters are arranged so that they are transferred through said memory output in the order of said one front control character, most significant to least significant data characters, and said one back control character, and for a second direction signal value, the characters are transferred through said memory output in the order of said one back control character, least significant to most significant data character, and said one front control character, the bit order of each data character being least significant to most significant bit for one direction signal value and most significant to least significant bit for the other direction signal value, said control logic comprising:

output buffer means responsive to said memory output signal, a first control signal, a second control signal, and a third control signal, for storing the one of the characters represented by said memory output signal provided during the time said first control signal is provided, and for providing in response to one of said second and third control signals an output buffer signal manifesting the character stored thereby, said output buffer signal manifesting a stored data character in the same predetermined significant bit order irrespective of the bit order of how that character is represented by the memory output signal applied to said output buffer means;

first counter means for incrementing its count by one each time one character of data stored in said memory is recirculated through said memory output, the count of said first counter being one during the time said one front control character is recirculated through said memory output in the event said direction signal has said first value, or during the time said one back control character is recirculated through said output in the event said direction signal has said second value;

first register means responsive to the size code manifested by said output buffer signal for being set to the count of said first counter means at the time the most significant data character is recirculated through said memory output;

second counter means, capable of being incremented or decremented, after being set to the count of said first counter means at the time the most significant data character is recirculated through said memory output, the count of said second counter being incremented after said output buffer signal is provided in the event said direction signal is said first value and being decremented after said output buffer signal is provided in the event said direction signal is said second value;

first comparing means for providing said first control signal when the counts of said first counter means and said second counter means are equal;

second comparing means for providing a fourth control signal whenever the counts of said second counter means and said first register means are equal; and control signal providing means responsive to said direction signal, said first control signal, and said fourth control signal for providing said second control signal after each first control signal occurs so long as said fourth control signal has not occurred in the event said direction signal has said first value, and for providing said third control signal after each first control signal occurs so long as said fourth control signal had not occurred in the event said direction signal has said second value.

10. The invention according to claim 9:

wherein said output buffer means includes a shift register responsive to said second control signal for shifting in one direction and responsive to said third control signal for shifting in the other direction.

11. The invention according to claim 9:

wherein said data characters stored in said output buffer means are stored in complemented form in the event said direction signal is said second value; and wherein said output buffer means in responding to said third control signal includes means for providing said output buffer signal as manifesting the complement of the character stored thereby.

12. The invention according to claim 11:

wherein the number manifested by said size code is equal to the number of front control characters plus the number of data characters stored in said memory; and wherein said first register means includes means for setting the count of said first register means to said size code number in the event said direction signal is said first value in response to said output buffer signal manifesting said first control character stored thereby.

* * * * *